United States Patent [19]

Bell, Jr. et al.

[11] 3,805,012
[45] Apr. 16, 1974

[54] ELECTRICAL DISCHARGE MACHINING POWER SUPPLY WITH PROTECTIVE SYSTEM FOR OUTPUT SWITCH FAILURE

[75] Inventors: Oliver A. Bell, Jr., Mooresville; Randall C. Gilleland, Statesville, both of N.C.

[73] Assignee: Colt Industries Operating Corp., New York, N.Y.

[22] Filed: Mar. 16, 1973

[21] Appl. No.: 341,980

[52] U.S. Cl.............. 219/69 S, 219/69 C, 219/69 P
[51] Int. Cl............................................. B23k 9/16
[58] Field of Search ............... 219/69 C, 69 P, 69 S

[56] References Cited
UNITED STATES PATENTS
3,746,826   7/1973   Bell.................................. 219/69 S Primary Examiner—J. V. Truhe
Assistant Examiner—Hugh D. Jaeger
Attorney, Agent, or Firm—Hauke, Gifford, Patalidis & Dumont

[57] ABSTRACT

A digitally controlled multivibrator for the power supply is used to supply machining power pulses of predetermined ON and OFF time duration. The pulse output from the digital multivibrator is passed through at least one intermediate drive stage to trigger an electronic output switch, which is operatively connected both to a main DC power source and the gap, to actually provide the machining power pulses thereto. Responsive to a predetermined drop in drive signal being furnished to the output switch, the cut-off of the main machining power source is provided through operation of a field effector transistor switch. In addition, the protective system which would cut off the output switch in its fail-short condition is inhibited for the duration of any gap short circuit condition.

14 Claims, 1 Drawing Figure

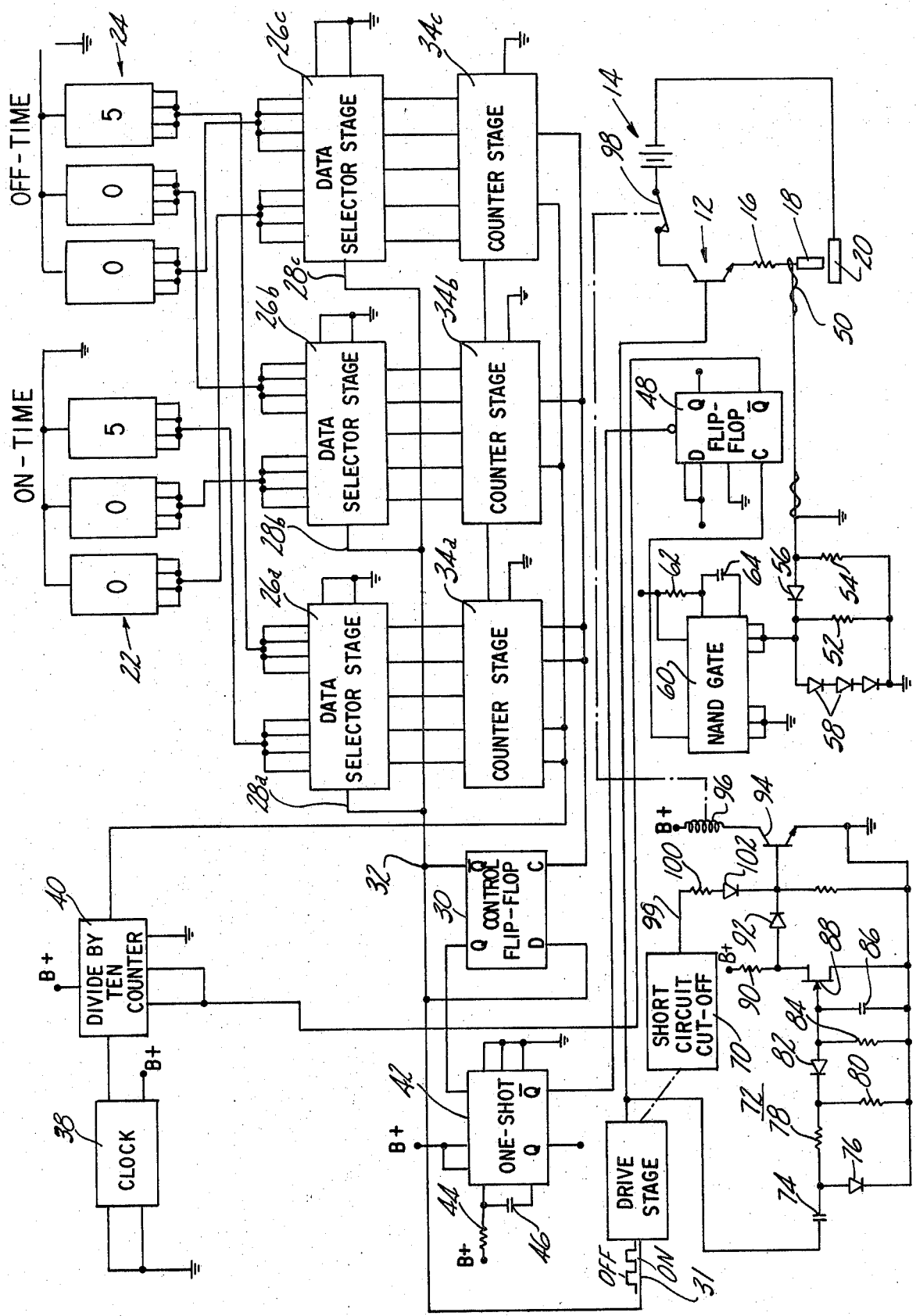

3,805,012

ELECTRICAL DISCHARGE MACHINING POWER SUPPLY WITH PROTECTIVE SYSTEM FOR OUTPUT SWITCH FAILURE

REFERENCE TO RELATED APPLICATION

This application is related to U.S. Pat. application Ser. No. 314,997, filed on Dec. 14, 1972, for "Method and Apparatus for Electrical Discharge Machining" on behalf of Oliver A. Bell, Jr.

BACKGROUND OF THE INVENTION

The field to which the present invention relates is that generally known as electrical discharge machining, sometimes hereinafter referred to as EDM, in which material is removed from an electrically conductive workpiece by the action of precisely controlled electrical gap discharges occurring between a tool electrode and the workpiece. A dielectric coolant fluid is circulated and recirculated through the gap, usually under pressure, throughout the machining operation. An electrode or a workpiece servo feed system is used to provide relative movement and thus maintain an optimum gap spacing between the electrode and workpiece as the workpiece material is being removed. It is important to the process of electrical discharge machining that the machining power pulses provided to the gap be of closely and precisely controllable ON-OFF time and frequency to insure repeatability of results and to provide appropriate cutting action for the particular type of operation being carried on. For example, with a roughing type machining operation, relatively high-low frequency, high current magnitude pulses would be used for cutting. For a finishing type machining operation, relatively high frequency, lower current magnitude pulses would be employed. Various types of pulse generators which have this capability and adjustability have been developed and are in current commercial use for electrical discharge machining. One commonly used type of electrical discharge machining power supply includes as a principal part of its machining power pulse generator an astable multivibrator in which ON-OFF time and frequencies are controlled and preset by a ganged capacitor and resistor arrangement. One example of this type of pulse generator is shown and described in Sennowitz U.S. Pat. No. 3,649,802, issued on Dec. 28, 1970 for "Protective System for Electrical Discharge Machining Power Supply Circuit," which patent is of common ownership herewith. Other types of pulse generators are in use which include various arrangements and combinations of astable multivibrators, oscillators and the like, to provide for precise control of the machining power pulse duration and frequency. The aforementioned Bell Pat. Application Ser. No. 314,997 discloses one example of a digital type multivibrator used to provide EDM.

It is essential in any electrical discharge machining power supply that the power be interrupted as soon as possible after occurrence of the failure of one of the output transistors which are used to provide the machining power pulses to the gap. This is necessary to prevent damage to electrode or workpiece once the failure condition has occurred. It should be noted that in typical commercial power supplies of the transistorized type that as many as twenty or more transistors, depending on their current capability, may be connected in a parallel bank to provide the current levels required for large cavity EDM machining. In the absence of an adequate protective circuit, the gap elements, electrodes and workpiece could be severely damaged if DC current were drawn through a shorted output transistor switch for an appreciable time.

According to the present invention, the main DC power supply is controlled through relay operation to actually remove all power available to the output transistors. Other circuits have been developed which provide a safeguard operation in the event of failure of the output switch or switches in an electrical discharge machining power supply. One example of this is U.S. Pat. No. 3,665,144 issued to Kurt H. Sennowitz for "Electrical Discharge Machining Power Supply with Protective System for Output Switch Failure" on May 23, 1972, which patent is of common ownership herewith. In this patent, the power supply has provision for actually shunting drive from the control electrode of the output transistor to the gap responsive to failure of the output transistor or transistors in the bank.

A different protective system is shown in U.S. Pat. No. 3,524,037, issued on Aug. 11, 1970 for "Fail Transistor Protective Circuit for Electrical Discharge Machining Apparatus" to Kurt H. Sennowitz, which patent is likewise of common ownership with the present application. In that patent, there is provided a drive signal sensing network of specialized configuration which is used to energize a cut-off relay and thus interrupt machining power responsive to failure of an output transistor.

SUMMARY OF THE INVENTION

The present invention will thus be seen to provide an EDM pulse generator, particularly adaptable for controlling in a precisely accurate manner the operation of one electronic switch or a bank of electronic switches, which have their power conducting electrodes connected between a DC power supply and the machining gap for providing the machining power pulses. Responsive to the failure of one or more of the output switches, there is provided an interruption of the main machining power to withhold cutting until the failed transistor or transistors can be replaced.

The present invention, while it discloses as a preferred embodiment an EDM circuit and a failure protection circuit including transistors employed as the electronic switches, is not limited to the use of this particular type of switch. By making substitution and minor revision of the circuits, it will be possible for one skilled in the electronic art to substitute other electronic switches for the transistors. By "electronic switch," I mean any electronic control device having two or more electrodes comprising at least two principal or power conducting electrodes effective to control current flow in the power circuit, the conductivity between the principal electrodes being controlled by a control electrode within the switch or by interruption or change of polarity of voltage applied to one of the principal electrodes, whereby the conductivity of the power circuit is controlled statically or electrically without movement of any actual mechanical element within the switch. Included in this definition by way of example but not limitation are electronic tubes, transistors, silicon controlled rectifiers and similar semiconductor devices.

The protective system which operates to interrupt power responsive to output switch failure senses the drive signal as it is applied to the control electrode of the output switch or switches. The signal is rectified and divided and the negative attenuated signal is applied to the gate of an N channel field effect transistor or FET. When the voltage swing being furnished from the drive signal disappears, the input capacitor is permitted to discharge through the resistor to turn on the field effect transistor, which in turn turns off a following stage transistor, thus deenergizing the transistor fail relay.

The protective system according to the present invention is related to gap short circuit interruption in such manner that during the operation of the short circuit cut-off system the transistor fail circuit will be inhibited.

The electronic output switch in the circuit of the present invention is controlled in its operation by a digital type multivibrator including a combination of transistor-transistor logic (TTL) type integrated circuits of medium scale integration and complexity, such as for example the several types hereinafter referred to which are now made and sold by the National Semiconductor Corp. of Santa Clara, Calif. Such circuits are available in a variety of combinations for use in the numerical control computer industry. Incorporation of such devices in the circuits of the present invention serves to reduce overall cost and add to the reliability and operation of the power supply circuits.

BRIEF DESCRIPTION OF THE DRAWING

The present invention, which will be fully described in the appended specification, is illustrated by the accompanying drawing, which drawing is a combined schematic and partially block diagrammatic showing of the preferred embodiment of the invention.

DESCRIPTION OF THE PREFERRED EMBODIMENT

The drawing shows the individual parts of the EDM pulse generator in block diagrammatic form as they are used to provide a triggering output pulse train to a drive stage 10, one or more of which stages may be used as required to provide pulse shaping and amplification to the multivibrator output pulses. The amplified triggering pulses are then applied to the base of one or more output transistor switches 12 as shown at the lower right hand corner of the drawing. The output switch 12 is incorporated as an NPH transistor having its collector connected to the positive terminal of the main DC power supply 14 and its emitter connected through a series current limiting resistor 16 to the tool electrode 18. The gap machining circuit is completed by a lead connected from the minus terminal of the DC power source 14 to the workpiece 20. The polarity illustrated in the drawing is that known as "reverse polarity," which form of polarity is commonly used with graphite-type electrodes and with certain workpiece materials. It will be understood that the opposite polarity, commonly known as "standard polarity," with the electrode minus and the workpiece positive, may be used for other desired combinations of electrode and workpiece. In any case, the reversal of polarity and the incorporation of a PNP transistor in place of the NPN output transistor switch 12 would be readily apparent to one skilled in the art.

Included in the digital multivibrator circuit are the ON-time switch 22 and the OFF-time switch 24, which include units, tens and hundreds setting in each, and are present in accordance with the ON-time and OFF-time required. In the present instance, the settings are in 1 to 999 microseconds. The switches 22 and 24 are preferably binary coded decimal thumbwheel switches which provide a visual readout display for the operator, enabling him to be informed of the settings at which the machining is being carried out. Also included in the digital multivibrator is an intermediate quadruple, two-input data selector stage 26a, 26b and 26c, as shown. The data selector stage in each case is capable of accepting the two separate four-bit binary coded decimal input data as preset by the ON-time switch 22 and the OFF-time switch 24. One type of quadruple dual input data selector which may be used in connection with the present invention is that known as Model N74157, which is manufactured and sold commercially by the National Semiconductor Corp. of Santa Clara, Calif.

There is thus provided a single data select input through leads 28a, 28b and 28c which selects either the ON-time switch preset data on switch 22 or the OFF-time preset data on switch 24, when the output is either high or low with respect to the control flip-flop 30 output at point 32, as will be more fully explained hereinafter.

The next following stage to the data selector stage 26 is a decimal counter stage 34 including the units, tens and hundreds sections identified respectively by the numerals 34a, 34b and 34c. According to the ON or OFF-time switch setting selected through the data selector stages 26a, 26b, 26c, there will be provided an appropriate output from the following counter stages 34a–34c. The three binary coded decimal counters may be, for example, of the type MC4016 manufactured and currently available from the Motorola Semiconductor Products Inc. of Phoenix, Arizona. The counters in the drawing are shown cascaded to provide the three digits as preset on the switches 22 and 24.

The source of high frequency clock pulses is provided by suitable clock pulse source 38 shown at the upper left hand portion of the drawing. The clock 38 is a 10 megaHerz clock and a following divide-ty-ten counter 40 is included in the circuit, the output of which provides the three digit counter stages 34a, 34b and 34c with an accurate one megaHerz clock pulse source. It will be understood that the decimal counters 34a–34c may be optionally of the count-down or count-up type.

Also included in the digital multivibrator is the control D flip-flop 30 already referred to, which is operated by a one-shot multivibrator stage 42. The one-shot multivibrator stage 42 is shown with an externally connected timing circuit, which includes a resistor 44 and a capacitor 46.

A second D-type flip-flop 48 is included in the circuit which provides an output from its $\overline{Q}$ terminal to control the operation of the divide-by-ten counter stage 40.

Also shown is a current sensing transformer 50 which is coupled to the gap input lead proximate to electrode 18 and is associated with a pulse forming network and divider stage, including resistors 52 and 54 and a signal diode 56. A diode string 58 is connected to ground. The signal from the diode 56 is provided as an input to a nand gate 60, which in turn provides an input to a second D flip-flop 48. Th nand gate 60 likewise has an external timing network which includes a resistor 62 and a capacitor 64

DESCRIPTION OF OPERATION

The operation of the digital multivibrator and the power supply during normal cutting will now be described beginning with reference to the time at which the ON-time period has just been terminated in accordance with the time duration preset on the ON-time switch 22. The output of the control flip-flop 30 from its $\overline{Q}$ terminal changes to a low state, thus providing the machining gap turn off. By "machining gap turn off," we mean interruption of the drive pulse to the output switch 12. When the output control flip-flop 30 goes to the low state at point 32, then the data selector input through leads 28a, 28b, 28c to the data selector stages 26a, 26b, 26c serves to select the set of preset four-bit information as already set on the OFF-time switch 24. The voltage being passed through the lead 31 and through the intermediate drive stage 10 is shown as a representative wave form suitably labeled ON and OFF on the lead 31. With the drive signal insufficient to trigger the drive stage 10 and the output transistor switch 12 into conduction, the gap remains OFF during the completion of the OFF time count predetermined by the setting of the switch 24.

When the counters 34a, 34b, 34c have completed their OFF count, an output from those counters to the control flip-flop 30 changes its state again so that the output from the $\overline{Q}$ terminal at point 32 is again altered. However, the leading edge of the status transition of the control D flip-flop 30 going from low state to high state triggers the one-shot stage 42, which in turn clears the second D flip-flop 48. This results in an output from the second D flip-flop 48 to the divide-by-ten counter stage 40, which inhibits the clock pulses being furnished to the counter 34 from the clock source 38. Thus, with the digital multivibrator maintained in the last described state, the arc is on but the counter 34 as preset by the ON-time switch 22 is inhibited. However, when the next following arc strikes it is sensed by the current sensing circuit, including the current sensing transformer 50 which provides a signal from the network including the diode 56. This signal is gated to the nand gate 60 and it changes the output from the second flip-flop 48 from inhibit to enable with respect to the divide-by-ten counter stage 40. The ON-time counter 34 as selected by the data selector stage 26a, 26b, 26c now begins its ON-time count cycle.

Accordingly, it will be seen that the digital multivibrator has an ON-time period which begins in each case with the first arc ignition, thus insuring a constant ON-time period during machining power pulses being furnished to the gap.

The output of the control D flip-flop 30 will thus be seen to comprise two separately effective outputs, one through lead 31 to provide the ON-off triggering pulse for the drive stage 10 and finally to the output switch 12, and at the same time a second output which properly, according to its high or low state, controls the data selector stages 26a, 26b or 26c to select either the On-time data or the OFF-time data for count.

It will be understood that a separate system is ordinarily incorporated in the EDM power supply to provide for interruption of pulses to the gap upon occurrence of gap short circuit condition. This condition is normally accompanied by an abrupt drop in gap voltage which may be sensed and used as a control signal to interrupt either the operation of the multivibrator itself or alternately to interrupt the passage of drive pulses from the drive stage 10.

The short circuit cut-off system is indicated in block form and identified by the numeral 70. One example of such a short circuit cut-off system, which may be used in connection with this circuit, is described and illustrated in my U.S. Pat. No. 3,705,969 issued on Dec. 12, 1972 for "Cut-Off Protection System for Electrical Discharge Machining Power Supply," which patent is of common ownership with this application. The relationship of the short circuit cut-off system 70 to the present invention, namely the transistor fail protection circuit, will be made clear from the explanation offered hereinafter.

The main portion of the output transistor fail protection circuit is indicated generally by the numeral 72. The fail protection circuit includes an input capacitor 74, which is coupled to the drive stage 10 output. A diode 76 is included in the circuit to ground the positive portion of each drive pulse. The negative portion is attenuated by a voltage divider including a pair of resistors 78 and 80. The negative attenuated signal is then passed by a diode 82 to resistor 84 and a second capacitor 86 where it is filtered to provide a control negative signal level. This level is supplied to the gate of an N channel FET 88, which is normally held off by the negative signal applied. During the non-conductive state of the FET 88, a positive voltage is fed through a resistor 90 and diode 92, which voltage turns on the next following transistor 94 to energize the transistor fail relay coil 96. The relay coil 96 holds actuated the normally closed contact 98, which is series connected between the positive terminal of the main power source 14 and the collector of the output transistor 12.

When the pulse resulting from the voltage swing of the drive signal disappears from the capacitor 86, it will discharge through the resistor 84, thus allowing the gate of the FET 88 to drop to substantially zero voltage, causing it to turn ON. When the FET 88 is rendered conductive, it drops the base of the transistor 94 to ground, thus turning it OFF and deenergizing the transistor fail relay so as to open the normally closed contact 98 and thus interrupting the power being furnished to the gap. In this way, power is disconnected from the gap until the transistor 12 which has failed short can be replaced with a normally operating device.

A separate signal input is provided through a lead 99 and a series connected resistor 100 and diode 102, which are connected to the base of the transistor 94. It is important that during relatively long OFF-times, such as are encountered during gap short circuit cut-off condition, the transistor fail circuit just described must be locked ON. Accordingly, during the operation of the short circuit cut-off stage 70, a plus voltage is supplied to the base of the transistor 94 through resistor 100 and diode 102 to continue to hold the transistor 93 ON until the cut-off circuit in turn has been deenergized.

It will thus be seen that by the present invention there has been provided a fast acting and reliable cut-off system which interrupts power to the gap upon failure of the output transistor or transistors used in the circuit.

What is claimed is:
1. In an electrical discharge machining apparatus including an electronic output switch and a DC power source operatively connected to a machining gap for providing machining power pulses of digitally predetermined ON-OFF time duration thereto, a digital type machining power pulse circuit including separately settable ON-time and OFF-time switches, a counter stage selectively connectible to one of the aforesaid ON and OFF-time switches, a data input selector stage connected intermediate said switches and said counter stage respectively, a bistable means operatively connected to said gap and having a pair of outputs, one of said outputs operably connected to said data input selector stage for connecting the appropriate one of said ON-OFF time switches to the counter stage and the other of said outputs operably connected to the control electrode of said electronic output switch for controlling its ON-OFF operation, and a protective circuit for interrupting power from said power source responsive to failure of said electronic output switch, said system comprising a keying network operatively coupled to the other of said outputs of said bistable means for sensing drive signal level, an electronic switching means having its control electrode coupled to said keying network and a power interruption relay operatively associated with said power source for interrupting it responsive to failure of said drive signal and operation of said switching means.

2. The combination as set forth in claim 1 wherein said second output of said bistable means is connected to the control electrode of said output switch through an intermediate amplifier and waveform shaping drive stage and wherein said keying network is coupled to the output of said drive stage.

3. The combination as set forth in claim 1 wherein said keying network comprises an input capacitor and an attenuating network coupled intermediate said input capacitor and the control electrode of said electronic switching means.

4. The combination as set forth in claim 3 wherein the output of said attenuating network is connected to a second capacitor, said second capacitor coupled across the control electrode and one of the principal electrodes of said electronic switching means and wherein said second capacitor is discharged responsive to failure of said drive signal thereby triggering said electronic switching means into operation.

5. The combination as set forth in claim 4 wherein a second electronic switching means is included, said second electronic switching means operatively connected to and controlled by said first switching means, said second switching means having one of its principal electrodes connected to said relay.

6. The combination as set forth in claim 5 wherein there is included in said electrical discharge machining apparatus a short circuit cut-off network, said cut-off network further operable to interrupt drive from said drive stage responsive to gap short circuit, and wherein there is included an output from said short circuit cut-off stage for inhibiting the operation of said second electronic switching means for the duration of said short circuit cut-off network operation.

7. The combination as set forth in claim 6 wherein said first electronic switching means comprises a field effect transistor having said second capacitor coupled to its gate and wherein said second electronic switching means comprises a transistor having one of its principal electrodes coupled to the control coil for said relay.

8. The combination as set forth in claim 7 wherein the output from said short circuit cut-off network is coupled to the control electrode for said second electronic switching means through a series resistor-diode network.

9. The combination as set forth in claim 8 wherein a second diode is connected between one of the principal electrodes of said field effect transistor and the junction of said first mentioned diode and the control electrode of said second electronic switching means.

10. The combination as set forth in claim 9 wherein said power interruption relay includes a normally closed contact coupled in series between one terminal of said DC source and one of the power conducting electrodes of said electronic output switch.

11. The combination as set forth in claim 10 wherein said second electronic switching means comprises an NPN transistor held in a normally conductive state and having its power conducting electrodes in series with said relay control coil and a voltage source.

12. In an electrical discharge machining apparatus including an electronic output switch and a DC power source operatively connected to a machining gap for providing machining power pulses of digitally predetermined ON-OFF time duration thereto, a digital type machining power pulse circuit including separately settable ON-time and OFF-time switches, a counter stage selectively connectible to one of the aforesaid ON and OFF-time switches, a data input selector stage connected intermediate said switches and said counter stage respectively, a bistable means operatively connected to said gap and having a pair of outputs, one of said outputs operably connected to said data selector stage for connecting the appropriate one of said ON-OFF time switches to the counter stage and the other of said outputs operably connected to the control electrode of said electronic output switch for controlling its ON-OFF operation, and a protective circuit for interrupting power from said power source responsive to failure of said electronic output switch, said system comprising a keying network operatively coupled to the other of said outputs of said bistable means for sensing drive signal level, an electronic switching means having its control electrode coupled to said keying network and means operatively associated with said power source for interrupting it responsive to failure of said drive signal and operation of said switching means.

13. The combination as set forth in claim 12 wherein said second output of said bistable means is connected to the control electrode of said output switch through an intermediate amplifier and waveform shaping drive stage, and wherein said keying network is coupled to the output of said drive stage.

14. The combination as set forth in claim 13 wherein said keying network comprises an input capacitor and an attenuating network coupled intermediate said input capacitor and the control electrode of said electronic switching means.

* * * * *